(12) United States Patent
Bolka et al.

(10) Patent No.: US 11,384,258 B2
(45) Date of Patent: Jul. 12, 2022

(54) METHOD FOR THE PRODUCTION OF A LAMINATED CORE

(71) Applicant: HIDRIA d.o.o., Ljubljana (SI)

(72) Inventors: Spela Bolka, Kranj (SI); Vitoslav Bratus, Ljubljana (SI); Ines Bergoc, Godovic (SI); Ivan Jerman, Vransko (SI); Marija Colovic, Ljubljana (SI); Mirjana Rodosek, Destrnik (SI)

(73) Assignee: HIDRIA d.o.o., Ljubljana (SI)

( * ) Notice: Subject to any disclaimer, the term of this patent is extended or adjusted under 35 U.S.C. 154(b) by 0 days.

(21) Appl. No.: 17/288,325

(22) PCT Filed: Oct. 24, 2019

(86) PCT No.: PCT/EP2019/079112
§ 371 (c)(1),
(2) Date: Apr. 23, 2021

(87) PCT Pub. No.: WO2020/084097
PCT Pub. Date: Apr. 30, 2020

(65) Prior Publication Data
US 2021/0371704 A1    Dec. 2, 2021

(30) Foreign Application Priority Data
Oct. 25, 2018  (EP) ................................ 18202697

(51) Int. Cl.
*B32B 7/12*    (2006.01)
*C09J 5/04*    (2006.01)
(Continued)

(52) U.S. Cl.
CPC .................. *C09J 5/04* (2013.01); *B32B 7/12* (2013.01); *B32B 15/043* (2013.01); *B32B 37/06* (2013.01);
(Continued)

(58) Field of Classification Search
CPC ........ C09J 5/04; C09J 163/00; C09J 2463/00; C09J 2400/166; B32B 2037/1253;
(Continued)

(56) References Cited

U.S. PATENT DOCUMENTS

| 2015/0097463 A1* | 4/2015 | Blocher ................. B21D 28/02 |
| | | 310/216.065 |
| 2017/0246849 A1 | 8/2017 | Ilinich |

FOREIGN PATENT DOCUMENTS

| DE | 10 2012 001744 | 8/2013 |
| JP | 2005 269732 | 9/2005 |

OTHER PUBLICATIONS

International Search Report dated Jan. 16, 2020.

* cited by examiner

*Primary Examiner* — Daniel McNally
(74) *Attorney, Agent, or Firm* — IPSILON USA, LLP

(57) ABSTRACT

The invention relates to a method for the production of a laminated core comprising a stack of metallic plates, in which: —a metallic sheet (2, 3) is chosen, having a first main face (4, 8) and a second main face (6, 9) which are coated with a sub-layer comprising at least one material selected from epoxides and polyepoxides, —a layer (12, 20) with a thickness of less than 500 μm of a precursor composition selected from partly epoxides and at least partly cross-linked polyepoxides is placed in contact with said sub-layer, —a layer (16, 22) with a thickness of less than 500 μm of a curing composition comprising at least one crosslinking agent is placed in contact with said sub-layer, —said metallic sheet is punched, —the metallic plates are then superposed to each other.

15 Claims, 4 Drawing Sheets

(51) Int. Cl.
*B32B 15/04* (2006.01)
*B32B 37/06* (2006.01)
*B32B 37/12* (2006.01)
*B32B 37/18* (2006.01)
*B32B 38/00* (2006.01)
*C09J 163/00* (2006.01)

(52) U.S. Cl.
CPC .......... *B32B 37/1284* (2013.01); *B32B 37/18* (2013.01); *B32B 38/145* (2013.01); *C09J 163/00* (2013.01); *B32B 2037/1253* (2013.01); *B32B 2255/06* (2013.01); *B32B 2255/24* (2013.01); *B32B 2255/26* (2013.01); *B32B 2255/28* (2013.01); *B32B 2305/77* (2013.01); *B32B 2363/00* (2013.01); *B32B 2457/00* (2013.01); *C09J 2400/166* (2013.01); *C09J 2463/00* (2013.01)

(58) Field of Classification Search
CPC ......... B32B 37/18; B32B 15/043; B32B 7/12; B32B 2457/00; B32B 2363/00; B32B 2305/77
See application file for complete search history.

METHOD FOR THE PRODUCTION OF A LAMINATED CORE

RELATED APPLICATION

This application is a National Phase of PCT/EP2019/0791132 filed on Oct. 24, 2019, which claims the benefit of priority from European Patent Application No. 18 202 697.1, filed on Oct. 25, 2018, the entirety of which are incorporated by reference.

FIELD OF THE INVENTION

The invention relates to a method of manufacturing for the production of a laminated core comprising a stack of metallic plates which are bonded together by an adhesive composition.

DESCRIPTION OF RELATED ART

Laminated cores are components such as a rotor or a stator of electrical motors or generators. Laminated cores may comprise up to hundreds of metallic plates put together.

The metallic plates are formed from a metallic sheet by stamping or punching or else by other methods such as laser cutting . . . . The plates are assembled so as to form a cohesive stack forming a laminated core. Some laminated cores are assembled by mechanically joining said plates, for example by welding or with interlocking ribs, or by bonding.

Welds and interlocking ribs result in significant disturbances of electro-magnetic fields, especially for high efficiency electrical motors. Bonding said metallic plates together instead of mechanical joining avoids these drawbacks.

US 2015/0097463 discloses a lamination stack consisting of punched laminations bonded together with an adhesive, as well as a method of manufacturing laminations stacks and tool for manufacturing laminations stacks comprising a punch press.

DE 10 2012 001744 discloses a method and a device for producing a laminated core from a plurality of stacked sheets in which an adhesive is applied on one side of said sheets and activated by heat. The sheet has a coating on both sides wherein on one side the coating is an adhesive and on the other side the coating is an insulating material. The coating can also be provided on only one side with a coating combining the two functions of gluing and electrical insulation.

US 2017/246849 discloses a method of producing a laminated article including a step of placing a first metal skin, a core, and a second metal skin onto each other, and then applying pressure and heat to form a shaped article. An adhesive may be added.

JP 2005 269732 discloses an iron core manufacturing method including the steps of punching a steel sheet in a predetermined shape, laminating the punched unit iron cores and coating a paste-like adhesive in a point-like or linear-like manner on the surface of the iron core.

OBJECTS AND SUMMARY

However, bonding techniques may not be satisfying enough in terms of heat resistance and long-time resistance to harsh conditions of the laminated core.

The invention aims to overcome these disadvantages.

The invention thus aims to propose a method for the production of a laminated core that is suitable for demanding fields such as the automotive area.

The invention thus relates to a method for the production of a laminated core comprising a stack of metallic plates, in which:
- at least one metallic sheet having a first main face and a second main face, parallel to and opposite said first main face, is selected, said first main face and said second main face being coated with a layer, named sub-layer, comprising at least one material selected from the group formed of epoxides, polyepoxides and their mixtures,
- at least one layer of a composition, named precursor composition, having a thickness of less than 500 μm is applied on top of at least part of at least one of said sub-layers coating said metallic sheet, said precursor composition comprising at least one material selected from the group formed of epoxides, at least partly cross-linked polyepoxides and their mixtures,
- at least one layer of a composition, named curing composition, having a thickness of less than 500 μm is applied on top of at least part of at least one of said sub-layers coating said metallic sheet, said curing composition comprising at least one crosslinking agent suitable for reacting by crosslinking with said at least one material selected from the group formed of epoxides, at least partly cross-linked polyepoxides and their mixtures,
- said metallic sheet is punched so that at least a first metallic plate and at least a second metallic plate are formed,
- then, said first metallic plate and said second metallic plate are superposed to each other so that said at least one layer of precursor composition and said at least one layer of curing composition are in contact with each other and superposed to each other between said first metallic plate and said second metallic plate.

Such a method according to the invention increases the reliability of the assembly, i.e. the adhesion, between each metallic plate of a manufactured laminated core and thus reduces the time for performing a method for the manufacture of a laminated core. Specifically, the inventors have found that the use, firstly, of a metallic sheet having a sub-layer comprising at least one material chosen from the group formed of epoxides, polyepoxides and their mixtures, and, secondly, of a precursor composition also comprising at least one material chosen from the group formed of epoxides, at least partly cross-linked polyepoxides and their mixtures, and of a curing composition, placed in contact with each other at a thickness of less than 500 μm makes it possible to accelerate the steps of a method according to the invention. The thicknesses of said layer of precursor composition and said layer of curing composition refer to thickness of a layer upon application, i.e. before curing and/or drying (such as by heating, exposure to ultraviolet radiation . . . ). Throughout the text, the term "epoxide" or "epoxy" denotes any material in which each molecule contains an oxirane group. Throughout the text, the term "polyepoxide", "epoxide polymer" or "polyepoxy" denotes any material in which each molecule contains at least two oxirane groups (in particular as end groups).

Each precursor composition and each curing composition is applied in a form that is not fully cured so as to allow its application on top of said sub-layers. Each precursor composition and each curing composition is in particular applied on top of said metallic sheets in liquid or pasty form (for example in the form of a resin).

The cutting of said metallic sheet by punching may be performed before and/or after applying said precursor composition and said curing composition on top of the sub-layer coating the first main face of said metallic sheet and of the sub-layer coating the second main face of said metallic sheet. The term "stamping" or "punching" denotes any operation for cutting a metallic sheet using a punch and a die.

In certain embodiments in accordance with the invention, said precursor composition and/or said curing composition are applied prior to punching said metallic sheet. In certain embodiments in accordance with the invention, said precursor composition and said curing composition are applied on top of said metallic sheet prior to punching said metallic sheet.

In order to arrange said at least one layer of precursor composition and said at least one layer of curing composition between said first metallic plate and said second metallic plate when metallic plates are brought closer and superposed to each other, several alternatives are possible. In certain embodiments in accordance with the invention, said precursor composition is applied on top of at least part of said sub-layer coating said first main face of said metallic sheet, and said curing composition is applied on top of at least part of said sub-layer coating said second main face of said metallic sheet. It is also possible to apply said precursor composition and said curing composition on top of at least part of said sub-layer coating said first main face of said metallic sheet (said sub-layer coating said second main face of said metallic sheet remaining uncoated), or, to apply said precursor composition and said curing composition on top of at least part of said sub-layer coating said second main face of said metallic sheet (said sub-layer coating said first main face of said metallic sheet remaining uncoated), or, to apply at least one layer of said precursor composition and at least one layer of said curing composition on top of at least part of said sub-layer coating said first main face of said metallic sheet and at least one layer of said precursor composition and at least one layer of said curing composition on top of at least part of said sub-layer coating said second main face. When said precursor composition and said curing composition are applied on top of only one face of said sub-layer (either first main face or said second main face of said metallic sheet), when bringing a metallic plate in contact with another metallic plate to superpose them, a face of said sub-layer coated with at least one layer of said precursor composition and at least one layer of said curing composition is contacted with a face of said sub-layer that is not coated with said precursor composition and said curing composition so that said at least one layer of precursor composition and said at least one layer of curing composition are in contact with each other and superposed to each other between said metallic plates.

In certain embodiments in accordance with the invention, each layer of precursor composition is applied over the full surface of said face of said sub-layer.

In certain embodiments in accordance with the invention, each layer of curing composition is applied over the full surface of said face of said sub-layer.

After applying the layers of precursor composition and of curing composition on top of the sub-layer coating the first main face of said metallic sheet and on top of the sub-layer coating the second main face of said metallic sheet, and after placing the layer of precursor composition and the layer of curing composition in contact with each other by superposing to each other the metallic plates obtained from said metallic sheet, a step of heating the stack thus formed makes it possible to accelerate the assembly of the metallic plates with each other and in particular the crosslinking reaction of the precursor compounds (epoxides, at least partly crosslinked polyepoxides) with each other and/or of said precursor compounds with said at least one agent for crosslinking the curing composition and/or with said sub-layers. In certain embodiments in accordance with the invention, the stack of said metallic plates is heated at a temperature between 50° C. and 170° C. for at least 3 seconds. In certain embodiments in accordance with the invention, the stack of said metallic plates is heated at a temperature between 70° C. and 140° C. for at least 10 seconds. A method according to the invention thus makes it possible to reduce the time and/or temperature of heating of the laminated core produced.

The precursor composition and/or the curing composition may comprise a solvent, especially for controlling the viscosity of the composition prepared as a function of the technique used for application on top of the metallic sheet. In certain embodiments in accordance with the invention, a solvent selected from the group formed of methanol, ethanol, n-propanol, 2-methylpropan-1-ol, 2-methoxypropanol, 2-propoxy-3-propanol, n-butanol, 2-butoxyethanol, 2-ethoxyethanol, 2-(2-butoxyethoxy)ethanol, isopropanol, butan-2-ol (sec-butanol), 4-methyl-2-pentanol, 2-methyl-2, 4-pentanediol (hexylene glycol), methyl isobutyl ketone, 4-hydroxy-4-methylpentan-2-one and their mixtures is added to the precursor composition. In certain embodiments in accordance with the invention, a solvent selected from the group formed of 2-methoxypropanol, 2-butoxyethanol, 2-ethoxyethanol, 2-(2-butoxyethoxy)ethanol, isopropanol, butan-2-ol (sec-butanol), 4-methyl-2-pentanol, 2-methyl-2, 4-pentanediol (hexylene glycol), methyl isobutyl ketone, 4-hydroxy-4-methylpentan-2-one and their mixtures is added to the precursor composition. In particular, in certain embodiments in accordance with the invention, a solvent selected from the group formed of 2-butoxyethanol, 2-ethoxyethanol, 2-(2-butoxyethoxy)ethanol, isopropanol, butan-2-ol (sec-butanol), 4-methyl-2-pentanol, 2-methyl-2, 4-pentanediol (hexylene glycol), methyl isobutyl ketone, 4-hydroxy-4-methylpentan-2-one, propylene-glycol propyl ether (1-propoxy-2-propanol) and their mixtures is added to the precursor composition.

In certain embodiments in accordance with the invention, a layer of precursor composition with a thickness of less than 200 µm is applied, and more particularly less than 100 µm, less than 90 µm, less than 80 µm, less than 70 µm, less than 60 µm, less than 50 µm, less than 40 µm, less than 30 µm, less than 10 µm, less than 9 µm, less than 8 µm, less than 7 µm, less than 6 µm, less than 5 µm, less than 4 µm, less than 3 µm, less than 2 µm, less than 1 µm, less than 950 nm, less than 900 nm, less than 850 nm. In certain embodiments in accordance with the invention, a layer of precursor composition with a thickness of between 20 nm and 800 nm, especially between 50 nm and 600 nm, is applied. In certain embodiments in accordance with the invention, a layer of precursor composition with a thickness of less than 500 nm, especially a thickness of between 100 nm and 400 nm and in particular a thickness of about 250 nm, is applied.

In certain embodiments in accordance with the invention, a layer of curing composition with a thickness of less than 200 µm is applied, and more particularly less than 100 µm, less than 90 µm, less than 80 µm, less than 70 µm, less than 60 µm, less than 50 µm, less than 40 µm, less than 30 µm, less than 10 µm, less than 9 µm, less than 8 µm, less than 7

µm, less than 6 µm, less than 5 µm, less than 4 µm, less than 3 µm, less than 2 µm, less than 1 µm, less than 950 nm, less than 900 nm, less than 850 nm. In certain embodiments in accordance with the invention, a layer of curing composition with a thickness of between 20 nm and 800 nm, especially between 50 nm and 600 nm, is applied. In certain embodiments in accordance with the invention, a layer of curing composition with a thickness of less than 500 nm, especially a thickness of between 100 nm and 400 nm and in particular a thickness of about 250 nm, is applied.

The thickness of the layer of precursor composition and the thickness of the layer of curing composition applied to the main faces of the same metallic sheet or of two metallic sheets intended to be placed in contact with each other may be identical or different, especially as a function of the nature of the compounds included in each of the two compositions and of their proportions in each of the two compositions.

The precursor composition and the curing composition may be applied on top of the sub-layer coating the first main face of said metallic sheet and on top of the sub-layer coating the second main face of said metallic sheet by means of any surface coating technique. In particular, in certain embodiments in accordance with the invention, said precursor composition and/or said curing composition are applied by spraying, by inkjet printing, by printing with transfer rollers, by coating, by dipping, by screen printing, by flexography, by tampoprinting or by lithography.

In certain embodiments in accordance with the invention, at least one of said precursor composition and at least one of said curing composition are applied by spraying. Application by spraying is in particular performed using an application device equipped with spraying nozzles fed with precursor composition and/or with curing composition.

In certain embodiments in accordance with the invention, at least one of said precursor composition and at least one of said curing composition are applied by inkjet printing. To do this, each composition may, if necessary, be partly diluted using a solvent in accordance with the invention.

In certain embodiments in accordance with the invention, at least one of said precursor composition and at least one of said curing composition are applied by tampoprinting or printing with transfer rollers.

In certain embodiments in accordance with the invention, said precursor composition comprises at least one epoxide selected from the group formed of bisphenol-A diglycidyl ether, bisphenol-A, bisphenol-F and their mixtures.

In certain embodiments in accordance with the invention, said precursor composition comprises at least one bisphenol-A diglycidyl ether of formula (I):

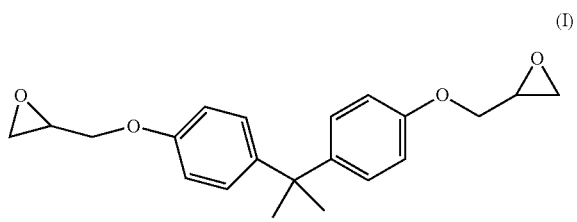 [SMILES: CC(C)(c1ccc(OCC2CO2)cc1)c1ccc(OCC2CO2)cc1]

(I)

In certain embodiments in accordance with the invention, said precursor composition comprises at least 0.1%, in particular at least 5%, and most particularly at least 10% by weight of at least one material chosen from the group formed of epoxides, polyepoxides and their mixtures relative to the total mass of the precursor composition.

In certain embodiments in accordance with the invention, said precursor composition comprises at least 10%, at least 20%, at least 30%, in particular at least 40%, and most particularly at least 50% by weight of at least one solvent relative to the total mass of the precursor composition. Such a precursor composition increases the reliability of the assembly of the manufactured laminated core and enables reducing the time for performing a method for the manufacture of a laminated core according to the invention.

In certain embodiments in accordance with the invention, said precursor composition comprises:
  0.1% to 35% by weight of at least one material chosen from the group formed of epoxides, at least partly cross-linked polyepoxides and their mixtures relative to the total mass of the precursor composition,
  65% to 99.9% by weight of at least one solvent relative to the total mass of the precursor composition,
  and less than 10% by weight of a powder as a rheology agent relative to the total mass of the precursor composition.

Weight percentages of said material chosen from the group formed of epoxides, at least partly cross-linked polyepoxides and their mixtures and of said solvent depend on the specific solvent that is used.

In certain embodiments in accordance with the invention, said curing composition comprises at least one crosslinking agent selected from the group formed of 2-methylimidazole, 2,4-diamino-6-[methylimidazolyl]ethyltriazine, dimethylbenzylamine, diethylenetriamine, N-aminoethylpiperazine, isophoronediamine, 3-(4-chlorophenyl)-1,1-dimethylurea and tris(dimethylaminomethyl)phenol and their mixtures.

In certain embodiments in accordance with the invention, said curing composition comprises at least one solvent selected from the group formed of methanol, ethanol, n-propanol, 2-methylpropan-1-ol, 2-methoxypropanol, n-butanol, 2-butoxyethanol, 2-ethoxyethanol, 2-(2-butoxyethoxy)ethanol, isopropanol, butan-2-ol (sec-butanol), 4-methyl-2-pentanol, 2-methyl-2,4-pentanedial (hexylene glycol), methyl isobutyl ketone, 4-hydroxy-4-methylpentan-2-one and their mixtures. In certain embodiments in accordance with the invention, said curing composition comprises 90% to 99.9% by weight of at least one such solvent chosen from the group formed of methanol, ethanol, n-propanol, 2-methylpropan-1-ol, 2-methoxypropanol, n-butanol, 2-butoxyethanol, 2-ethoxyethanol, 2-(2-butoxyethoxy)ethanol, isopropanol, butan-2-ol (sec-butanol), 4-methyl-2-pentanol, 2-methyl-2,4-pentanediol (hexylene glycol), methyl isobutyl ketone, 4-hydroxy-4-methylpentan-2-one and their mixtures, relative to the total mass of the curing composition.

In certain embodiments in accordance with the invention, said curing composition comprises at least 0.1%, in particular at least 1%, and most particularly at least 5% by weight of at least one crosslinking agent relative to the total mass of the curing composition.

In certain embodiments in accordance with the invention, said curing composition comprises at least 80%, in particular at least 85%, and most particularly at least 90% by weight of at least one such solvent relative to the total mass of the curing composition.

In certain embodiments in accordance with the invention, said curing composition comprises:
  0.1% to 10% by weight of at least one crosslinking agent relative to the total mass of the curing composition,
  90% to 99.9% by weight of at least one such solvent relative to the total mass of the curing composition,
  less than 10% by weight of a powder as a rheology agent relative to the total mass of the curing composition.

Throughout the text, "weight percentage" means a "percentage by mass".

In certain embodiments in accordance with the invention, a pigment is added to the precursor composition or to the curing composition. Specifically, the composition of the precursor composition is similar to that of an ink as it may comprise a solvent and a pigment. Such a pigment makes it possible to colour the composition in the manner of an ink and has the advantage of enabling, if necessary, visual control of the areas of the sub-layer of the metallic sheet onto which the precursor composition has effectively been applied during a method according to the invention.

In certain embodiments in accordance with the invention, at least one powdered rheological agent is added to the precursor composition or to the curing composition. Said rheological agent may be chosen from the group formed of clays, silica, fumed silica, alumina, calcium oxide, talc and their mixtures. Said precursor composition and/or said curing composition can also contain polymeric rheology agents, such as polyvinylpyrrolidone (PVP).

Various embodiments may be envisaged as regards the composition of said sub-layers coating the first main face of said metallic sheet and the second main face of said metallic sheet. Each sub-layer may comprise an epoxide or polyepoxide material in partly cross-linked or substantially totally cross-linked form (i.e. before or at the time of applying the precursor composition or the curing composition on top of said metallic sheet coated with said sub-layer). Said sub-layer may also comprise at least one crosslinking agent suitable for reacting by crosslinking with at least one material chosen from the group formed of epoxides, at least partly cross-linked polyepoxides and their mixtures. When said sub-layer comprises at least one epoxide and/or at least one polyepoxide that is only partly cross-linked (not totally cross-linked), said sub-layer is said to be "self-adhesive" or "self-bonding" since it is capable of adhering to a material with which it is placed in contact when the curing of said partly cross-linked polyepoxide takes place, especially by being activated by heating and/or due to the presence of said at least one crosslinking agent in said sub-layer. In certain embodiments in accordance with the invention, the sub-layer chosen comprises at least one material chosen from the group formed of epoxides and at least one crosslinking agent. When all of the polyepoxides of said sub-layer are already totally cross-linked, said sub-layer is said to be "non self-bonding" or "fully cured".

In certain embodiments in accordance with the invention, at least one of said first main face and said second main face of said metallic sheet is coated with a sub-layer that contains at least one material chosen from the group formed of epoxides, only partly cross-linked polyepoxides and their mixtures. Such a sub-layer enables obtaining stronger assembly of the laminated core while reducing temperature and/or time needed to obtain said laminated core.

After application of said curing composition and/or said precursor composition, said curing composition can react with said sub-layer (whether it is of the "self-bonding" type or of the "fully cured" type).

In certain embodiments in accordance with the invention, said metallic sheet is chosen from sheets formed of at least one material selected from the group formed of iron, steel, copper, metal alloys comprising copper, aluminium and metal alloys comprising aluminium. In particular, in certain embodiments in accordance with the invention, said metallic sheet is chosen from iron sheets and steel sheets.

The invention also relates to a method and a device for performing such a method, characterized, separately or in combination, by all or some of the features mentioned hereinabove or hereinbelow. Irrespective of the formal presentation given thereto, unless explicitly mentioned otherwise, the various features mentioned hereinabove or hereinbelow should not be considered as intimately or inextricably linked together, since the invention may concern only one of these structural or functional features, or only part of these structural or functional characteristics, or only part of one of these structural or functional features, or alternatively any group, combination or juxtaposition of all or part of these structural or functional features.

BRIEF DESCRIPTION OF THE DRAWINGS

Other aims, features and advantages of the invention will emerge on reading the following non-limiting description of certain possible embodiments thereof, and which refers to the attached figures, in which:

In FIGS. 1 to 5, the scales and sizes have not been respected, for illustrative purposes, and the thicknesses are exaggeratedly enlarged.

DETAILED DESCRIPTION

Figure 1:
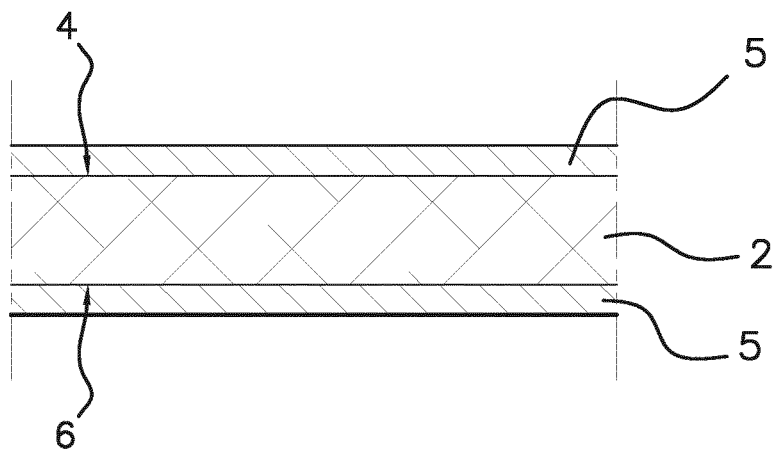
FIG. 1 is a schematic view in partial cross section of a metallic sheet used in a method of manufacturing a laminated core according to the invention.

FIG. 1 represents a metallic sheet 2 having a first main face 4 and a second main face 6, which are parallel to each other and coated with a sub-layer 5 comprising at least one material selected from the group formed of epoxides, at least partly cross-linked polyepoxides and their mixtures.

The metallic sheet pre-coated with such a sub-layer 5 or onto which is applied such a sub-layer during a method according to the invention may be in the form of a roll or of a rolled-up metallic strip. The metallic sheet 2 is formed of a metal or a metal alloy such as steel.

Such a metallic sheet 2 coated with such a sub-layer 5 has a total thickness of between 0.2 mm and 3.03 mm, said metallic sheet 2 having a thickness of between 0.2 mm to 3 mm, more particularly from 0.3 mm to 0.5 mm, and each sub-layer 5 having a thickness of between 1.2 µm to 15 µm, more particularly from 1.5 µm to 6 µm.

Figure 2:
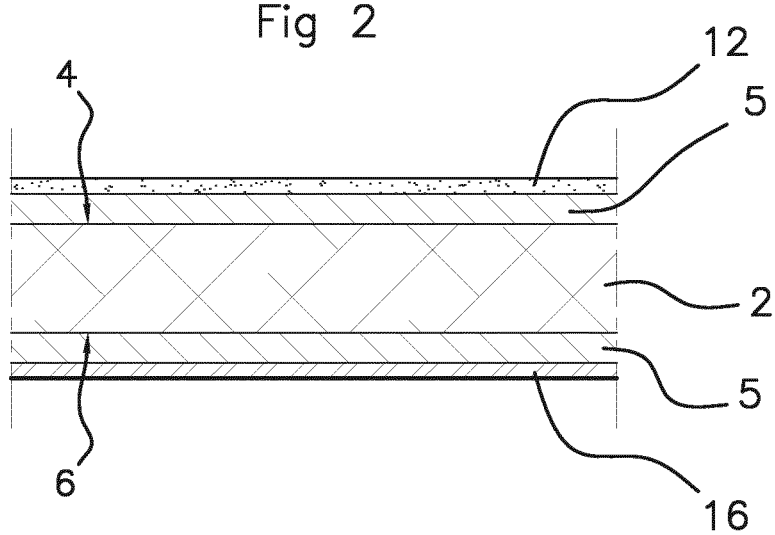
FIG. 2 is a schematic view in partial cross section of a step for manufacturing a laminated core according to the invention.

FIG. 2 illustrates a first step of a method according to the invention, during which a layer 12 of precursor composition and a layer 16 of curing composition are applied onto the sub-layer 5 of the metallic sheet 2. FIG. 2 thus represents the metallic sheet 2 coated with sub-layers 5 on top of which have been applied, respectively, a layer 12 of a precursor composition and a layer 16 of a curing composition. The layer 12 of precursor composition is applied on top of the sub-layer 5 of the first main face 4 of the metallic sheet 2 and the layer 16 of curing composition is applied on top of the sub-layer 5 of the second main face of the metallic sheet 2.

It is also possible to apply the layer 12 of precursor composition and the layer 16 of curing composition on top of the sub-layer of the first main face 4 of the metallic sheet 2 (variant not shown).

The precursor composition comprises at least one material chosen from the group formed of epoxides, polyepoxides and their mixtures, and in particular an epoxy resin chosen from the group formed of bisphenol-A diglycidyl ether (BADGE), bisphenol-A, bisphenol-F and their mixtures.

The curing composition comprises at least one crosslinking agent suitable for reacting by crosslinking with said at least one material chosen from the group formed of epoxides, polyepoxides and their mixtures. The crosslinking agent is chosen in particular from the group formed of 2-methylimidazole, 2,4-diamino-6-[methylimidazolyl]ethyltriazine, dimethylbenzylamine, diethylenetriamine, N-aminoethylpiperazine, isophoronediamine, 3-(4-chlorophenyl)-1,1-dimethylurea and tris(dimethylaminomethyl) phenol and their mixtures.

The precursor composition and the curing composition may each also comprise at least one solvent chosen from the group formed of methanol, ethanol, n-propanol, 2-methylpropan-1-ol, 2-methoxypropanol, n-butanol, 2-butoxyethanol, 2-ethoxyethanol, 2-(2-butoxyethoxy)ethanol, isopropanol, butan-2-ol (sec-butanol), 4-methyl-2-pentanol, 2-methyl-2,4-pentanediol (hexylene glycol), methyl isobutyl ketone, 4-hydroxy-4-methylpentan-2-one and their mixtures.

Each precursor composition comprises:
- 0.1% to 35% by weight of at least one material chosen from the group formed of epoxides, at least partly cross-linked polyepoxides and their mixtures relative to the total mass of the precursor composition,
- 65% to 99.9% by weight of at least one solvent relative to the total mass of the precursor composition,
- and less than 10% by weight of a powder as a rheology agent relative to the total mass of the precursor composition.

Weight percentages of said material chosen from the group formed of epoxides, at least partly cross-linked polyepoxides and their mixtures and of said solvent depend on the specific solvent that is used.

Each curing composition comprises:
- 0.1% to 10% by weight of at least one crosslinking agent relative to the total mass of the curing composition,
- 90% to 99.9% by weight of at least one such solvent relative to the total mass of the curing composition,
- less than 10% by weight of a powder as a rheology agent relative to the total mass of the curing composition.

Said powder that may be added to said precursor composition and/or to said curing composition as a rheology agent is chosen in particular from the group formed of clays, silica, fumed silica, alumina, calcium oxide, talc and their mixtures. Said precursor composition and/or said curing composition can also contain polymers as rheology agents, such as polyvinylpyrrolidone (PVP).

In the embodiment illustrated in FIGS. 1 to 5, the precursor composition is applied on top of all of the sub-layer of the first main face 4 of the metallic sheet 2, forming a layer with a thickness of less than 50 μm, in particular less than 10 μm, less than 1 μm and for example less than 500 nm. The curing composition is applied on top of all of the sub-layer of the second main face 6 of the metallic sheet 2, forming a layer with a thickness of less than 50 μm, in particular less than 10 μm, less than 1 μm and for example less than 500 nm.

The precursor composition and the curing composition may be applied simultaneously to the same metallic sheet 2 or one after the other, the precursor composition possibly being applied before the curing composition, and, vice versa, the precursor composition possibly being applied after the curing composition.

Figure 3:
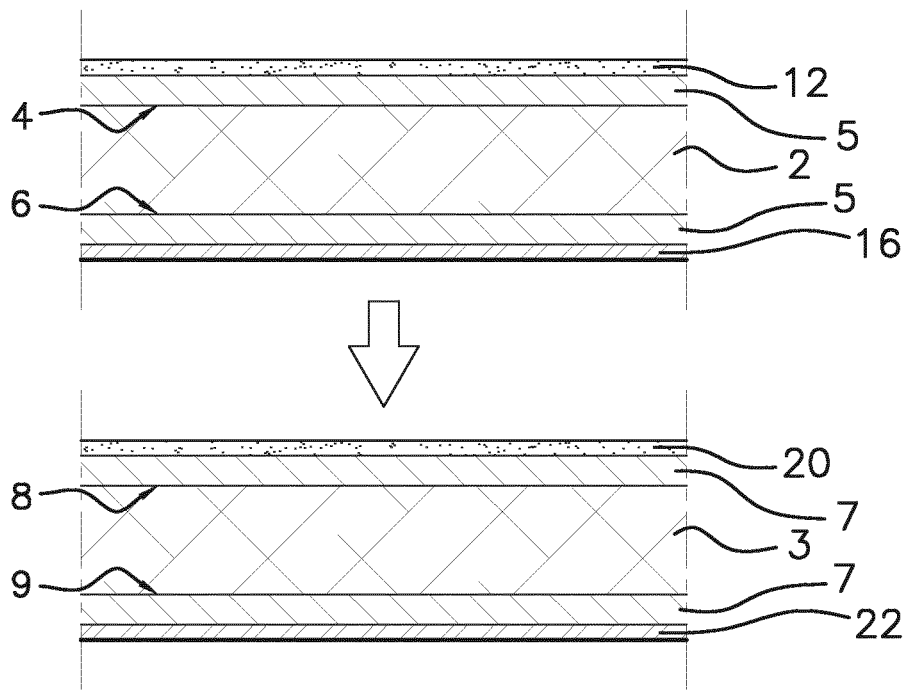
FIG. 3 is a schematic view in partial cross section of a step for manufacturing a laminated core according to the invention.

FIG. 3 illustrates a second step of a method according to the invention subsequent to the step illustrated in FIG. 2 and during which a first metallic plate and a second metallic plate are superposed to each other so as to place a layer 20 of precursor composition and the layer 16 of curing composition in contact with each other. When said precursor composition and said curing composition are brought in contact with each other they form an adhesive composition that enables bonding of the metallic plates together so as to form a laminated core (after drying and/or heating when needed). The second metallic plate is identical to the first metallic plate obtained in FIG. 2 and comprises a metallic sheet 3 having a first main face 8 and a second main face 9, which are parallel to each other, coated with a sub-layer 7 comprising at least one material chosen from the group formed of epoxides, at least partly cross-linked polyepoxides and their mixtures, a layer 20 of a precursor composition and a layer 22 of a curing composition having been applied on top of the sub-layers 7.

Figure 4:
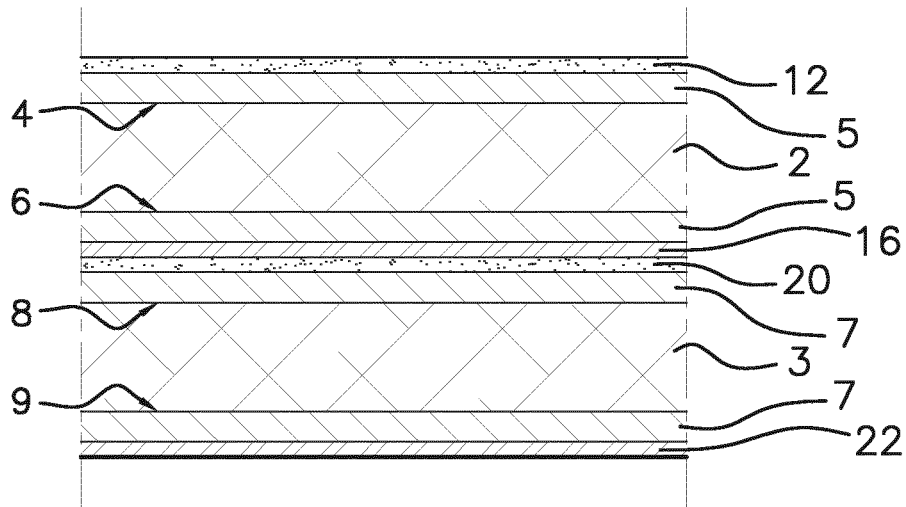
FIG. 4 is a schematic view in partial cross section of a step for manufacturing a laminated core according to the invention.

FIG. 4 illustrates a step of a method according to the invention subsequent to the step illustrated in FIG. 3 and during which the first metallic plate and the second metallic plate are placed in contact with each other and are optionally pressed together, a pressure possibly being applied to the stack of metallic plates. Said pressure may be from 0.6 MPa to 12 MPa, and more particularly from 1.2 MPa to 3 MPa.

Figure 5:
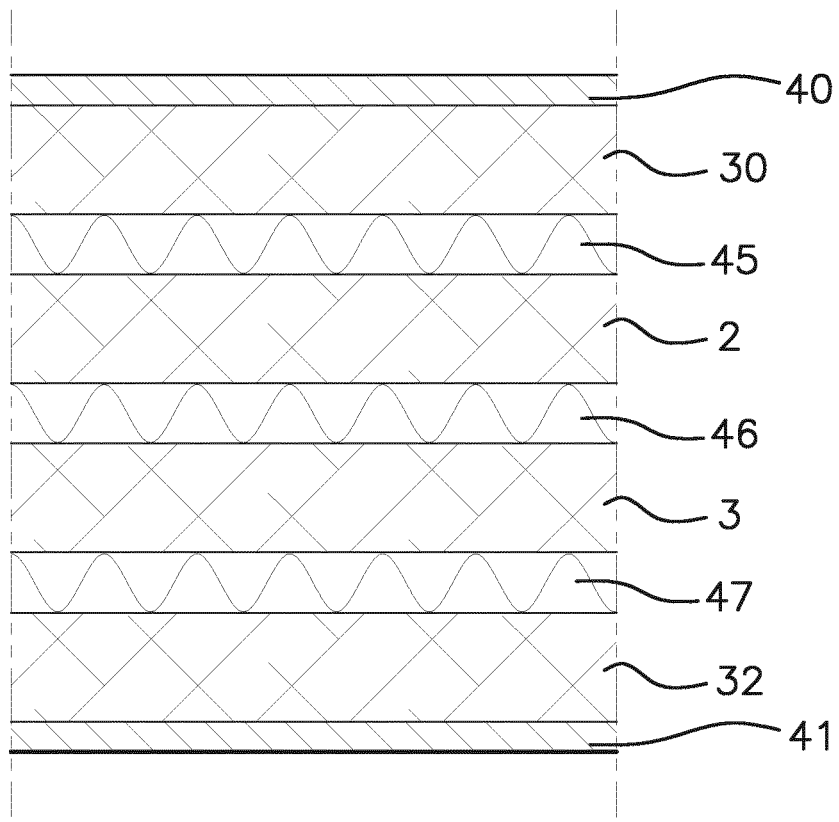
FIG. 5 is a schematic view in partial cross section of a step for manufacturing a laminated core according to the invention.

FIG. 5 illustrates a step of a method according to the invention subsequent to the step illustrated in FIG. 4 and represents the stack of metallic plates represented in FIG. 4 and onto which have been superposed, in the same manner, two other identical metallic plates on conclusion of a step of heating at a temperature of between 50° C. and 170° C. for at least 3 seconds. The laminated core thus obtained comprises four layers 30, 2, 3 and 32 of metallic sheets, between which are adhesive layers 45, 46 and 47 obtained by chemical reaction and cross-linking reaction of the sub-layers 5, 7, of the layers 12, 20 of precursor composition and of the curing layers 16, 22. Outer layers 40 and 41 of said stack may be formed of only a sub-layer such as sub-layer 5 or else of said sub-layer and a layer of said precursor composition and/or a layer of said curing composition.

Figure 6:
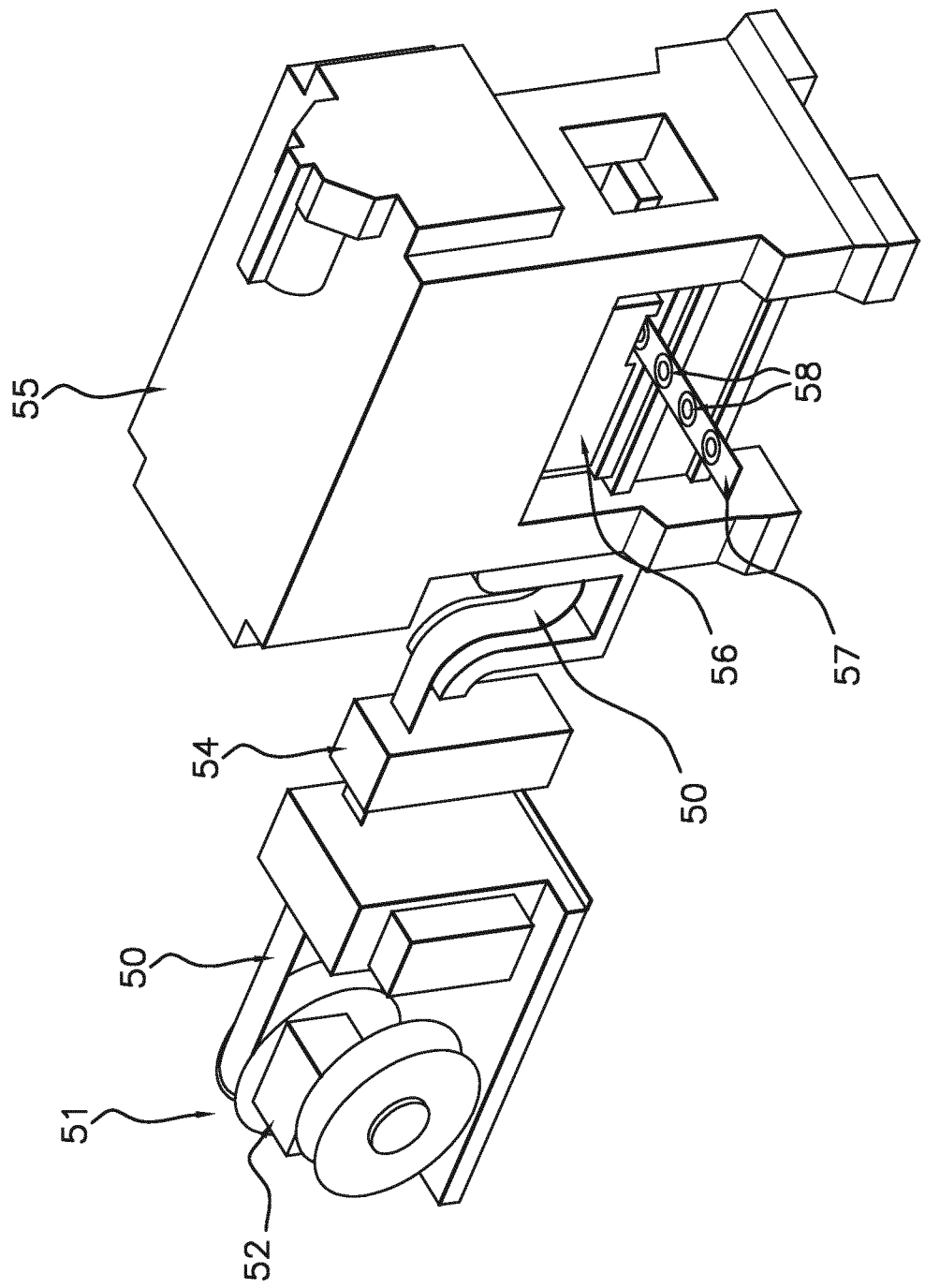
FIG. 6 is a schematic view in perspective of a device for performing a method according to the invention.

FIG. 6 represents a device for performing a method according to the invention. Said device comprises:
- a decoiler 52 in which a material coil 51 (metallic coil coated with said sub-layer) is placed from which a metallic sheet 50 is extracted,
- a straightener 54 that continuously flattens said metallic sheet 50 from said decoiler 52,
- a stamping press 55 containing a stamping tool 56 with punches and dies, and a feeder (not visible), said stamping tool 56 comprising a heating device,
- and a conveyor belt 57 from which finished laminated cores 58 are going out from said stamping press 56.

The laminated cores 58 manufactured via a method according to the invention show excellent resistance under the stringent thermal and chemical or humid conditions which are especially those of motor vehicle engines. The laminated cores thus manufactured via a method according to the invention also have a shear strength of greater than 10 MPa and a peel resistance of greater than 2.5 N/mm in the peel test performed at room temperature.

EXAMPLE 1

A precursor composition is prepared, said precursor composition comprises:
- 10% by weight of bisphenol-A diglycidyl ether (BADGE),
- 90% by weight of 2-methoxypropanol as a solvent relative to the total mass of the precursor composition.

A curing composition is prepared, said curing composition comprises:
- 6% by weight of N-aminoethylpiperazine,
- 94% by weight of 2-methoxypropanol as a solvent relative to the total mass of the curing composition.

A layer of precursor composition and a layer of curing composition are applied onto the sub-layer of the metallic sheet. The precursor composition is applied on top of the sub-layer over the full surface of a first main face of the metallic sheet and the curing composition is applied on top of the sub-layer over the full surface of a second main face of the metallic sheet. Said precursor composition and said curing composition are applied by ink jet printing.

The metallic plates are superposed to each other so as to place each layer of precursor composition in contact with a layer of curing composition.

All of said metallic plates, for example from 30 to 200 metallic plates, are then placed in contact with each other and a pressure is applied onto the stack of metallic plates at the same time they are subjected to a step of heating at a temperature of 120° C. for 2 minutes.

EXAMPLE 2

A precursor composition is prepared, it comprises:
- 3% by weight of bisphenol-A diglycidyl ether (BADGE),
- 95% by weight of 2-methoxypropanol as a solvent relative to the total mass of the precursor composition,
- 2% by weight of clay as a rheology agent relative to the total mass of the precursor composition.

A curing is prepared, it comprises:
- 1% by weight of diethylenetriamine (DETA),
- 95% by weight of 2-methoxypropanol as a solvent relative to the total mass of the curing composition,
- 4% by weight of clay as a rheology agent relative to the total mass of the curing composition.

A layer of precursor composition and a layer of curing composition are subsequently applied onto only one face of the sub-layer of the metallic sheet. That is to say that a layer of curing composition is applied onto the full surface of said face of the sub-layer of the metallic sheet and then a layer of precursor composition is applied on the full surface of said layer of curing composition. Said precursor composition and said curing composition are applied by spraying.

The metallic plates are superposed to each other so as to place a layer of precursor composition and a layer of curing composition between each metallic sheet.

All of said metallic plates, for example from 30 to 200 metallic plates, are then placed in contact with each other and a pressure is applied onto the stack of metallic plates at the same time they are subjected to a step of heating at a temperature of 120° C. for 2 minutes.

The invention may be the subject of numerous variants and applications other than those described hereinabove. In particular, unless otherwise mentioned, the various structural and functional features of each of the embodiments described hereinabove should not be considered as combined and/or intimately and/or inextricably linked together, but, on the contrary, as simple juxtapositions. In addition, the structural and/or functional features of the various embodiments described hereinabove may be, in total or in part, the subject of any different juxtaposition or of any different combination. For example, it is possible to use metallic plates having layers of precursor composition in which the chemical composition or the proportion of the components of the composition varies from one superposed plate to another.

The invention claimed is:

1. A method for the production of a laminated core comprising a stack of metallic plates, in which:
    at least one metallic sheet having a first main face and a second main face, parallel to and opposite said first main face, is selected,
    said first main face and said second main face being coated with a layer, named sub-layer, comprising at least one material selected from the group consisting of epoxides, polyepoxides and their mixtures,
    at least one layer of a composition, named precursor composition, having a thickness of less than 500 pm is applied on top of at least part of at least one of said sub-layers coating said metallic sheet, said precursor composition comprising at least one material selected from the group consisting of epoxides, at least partly cross-linked polyepoxides and their mixtures,
    at least one layer of a composition, named curing composition, having a thickness of less than 500 pm is applied on top of at least part of at least one of said sub-layers coating said metallic sheet, said curing composition comprising at least one crosslinking agent suitable for reacting by crosslinking with said at least one material selected from the group consisting of epoxides, at least partly cross-linked polyepoxides and their mixtures,
    said metallic sheet is punched so that at least a first metallic plate and at least a second metallic plate are formed,
    then, said first metallic plate and said second metallic plate are superposed to each other so that said at least one layer of precursor composition and said at least one layer of curing composition are in contact with each other and superposed to each other between said first metallic plate and said second metallic plate.

2. The method according to claim 1, wherein at least one solvent selected from the group consisting of 2-methoxypropanol, 2-butoxyethanol, 2-ethoxyethanol, 2-(2-butoxyethoxy)ethanol, isopropanol, butan-2-ol, 4-methyl-2-pentanol, 2-methyl-2,4-pentanediol, methyl isobutyl ketone, 4-hydroxy-4-methylpentan-2-one and their mixtures is added to the precursor composition.

3. The method according to claim 2, wherein said precursor composition comprises at least 10% by weight of said at least one solvent, relative to the total mass of said precursor composition.

4. The method according to claim 1, wherein said precursor composition and said curing composition are applied on top of said metallic sheet prior to punching said metallic sheet.

5. The method according to claim 1, wherein the stack of said metallic plates is heated at a temperature between 50° C. and 170° C. for at least 3 seconds.

6. The method according to claim 1, wherein said precursor composition is applied on top of at least part of said sub-layer coating said first main face of said metallic sheet, and said curing composition is applied on top of at least part of said sub-layer coating said second main face of said metallic sheet.

7. The method according to claim 1, wherein a layer of precursor composition with a thickness of less than 10 pm is applied.

8. The method according to claim 1, wherein at least one of said precursor composition and at least one of said curing composition are applied by spraying.

9. The method according to claim 1, wherein at least one of said precursor composition and at least one of said curing composition are applied by inkjet printing.

10. The method according to claim 1, wherein at least one of said precursor composition and at least one of said curing composition are applied by tampoprinting or printing with transfer rollers.

11. The method according to claim 1, wherein said precursor composition comprises at least one polyepoxide selected from the group consisting of bisphenol-A diglycidyl ether, bisphenol-A, bisphenol-F and their mixtures.

12. The method according to claim 1, wherein said curing composition comprises at least one crosslinking agent selected from the group consisting of 2-methylimidazole, 2,4-diamino-6-[methylimidazolyl]ethyltriazine, dimethylbenzylamine, diethylenetriamine, N-aminoethylpiperazine, isophoronediamine, 3-(4-chlorophenyl)-1, 1-dimethyl urea and tris(dimethylaminomethyl)phenol and their mixtures.

13. The method according to claim 1, wherein said curing composition comprises 90% to 99.9% by weight of at least one solvent chosen from the group consisting of methanol, ethanol, n-propanol, 2-methylpropan-1-ol, 2-methoxypropanol, n-butanol, 2-butoxyethanol, 2-ethoxy ethanol, 2-(2-butoxyethoxy)ethanol, isopropanol, butan-2-ol, 4-methyl-2-pentanol, 2-methyl-2,4-pentanediol, methyl isobutyl ketone, 4-hydroxy-4-methylpentan-2-one and their mixtures, relative to the total mass of the curing composition.

14. The method according to claim 1, wherein the sub-layer chosen comprises: at least one material selected from the group consisting of epoxides, at least partly cross-linked polyepoxides and their mixtures, and at least one crosslinking agent suitable for reacting by crosslinking with said at least one material selected from the group consisting of epoxides, at least partly cross-linked polyepoxides and their mixtures.

15. The method according to claim 1, wherein said metallic sheet is chosen from sheets formed of at least one material selected from the group consisting of iron, steel, copper, alloys comprising copper, aluminium and alloys comprising aluminium.

* * * * *